April 7, 1959

B. F. WILEY 2,880,613

FLOW MEASURING APPARATUS

Filed June 9, 1955

INVENTOR.
B. F. WILEY

BY Hudson & Young
ATTORNEYS

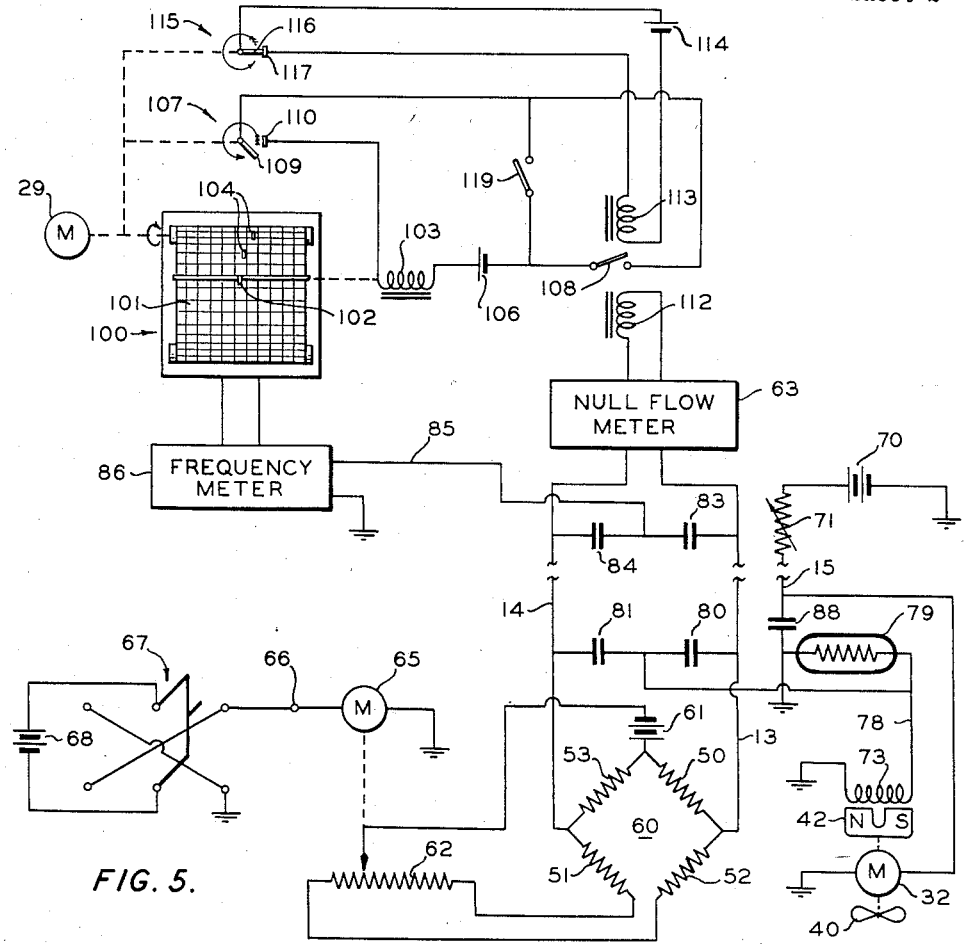

INVENTOR.
B. F. WILEY
BY
Hudson & Young
ATTORNEYS

United States Patent Office 2,880,613
Patented Apr. 7, 1959

2,880,613

FLOW MEASURING APPARATUS

Bruce F. Wiley, Bartlesville, Okla., assignor to Phillips Petroleum Company, a corporation of Delaware Application June 9, 1955, Serial No. 514,196

10 Claims. (Cl. 73—155)

This invention relates to apparatus to measure fluid flow through bore holes. In another aspect it relates to apparatus for recording electrical signals at selected times.

In certain petroleum operations it is desirable to inject fluids through a bore hole into surrounding earth formations. This is particularly true in water flooding operations wherein water is pumped through a first bore hole to enter surrounding formations and force oil deposited therein into an adjoining producing well. It is desirable to determine the rate fluid is injected into various sections of the bore hole in order to control the rate at which oil is forced through the surrounding formations. The obvious method of measuring flow rates in bore holes is to position a conventional flowmeter at different depths within the bore hole and measure the total flow therepast. However, this procedure requires a previous caliper survey of the bore hole diameter and is not entirely reliable. Water may accumulate in cavities in the bore hole to cause erroneous readings.

Improved flow measuring apparatus has recently been developed for this use. The apparatus includes a pair of parallel flow paths between sections of a well which are separated by a packer. The first flow path has a flow indicating device positioned therein which also functions to direct a portion of the total flow through this path. Means are provided to determine the condition of null flow through the second path. At the condition of null flow through the second path, the measured flow through the first path represents the total flow through the meter. Because there is no pressure difference across the packer, the total flow is through the first path. This eliminates the need of an absolutely fluid-tight packer, which obviously is difficult to provide. The null flow condition is determined by a temperature sensitive resistance element positioned in the second path. The temperature sensitive resistance element is connected in a bridge circuit which provides an electrical signal representative of the temperature of the element. A first circuit is provided to transmit this signal to the surface of the bore hole over a pair of conducting cables. An electric motor is employed to rotate an impeller in the first flow path. The speed of rotation of the motor driven impeller is measured by a telemetering circuit which transmits pulses to the surface at a frequency proportional to the frequency of rotation of the impeller.

In accordance with the present invention, recording means are provided to indicate automatically the flow rates at various depths. The impeller speed signal is recorded at the surface at the time the bridge unbalance signal is a maximum, indicating null flow through the first path.

Accordingly, it is an object of this invention to provide improved apparatus to measure flow rates at inaccessible locations.

Another object is to provide apparatus for measuring the rates of fluid flow from a bore hole into surrounding earth formations.

A further object is to provide apparatus to record a first signal when a second signal is of predetermined magnitude.

Other objects, advantages and features of the invention should become apparent from the following detailed description taken in conjunction with the accompanying drawing in which:

Figure 5 is a schematic circuit diagram of the electrical components of the flow measuring and recording apparatus;

Figure 6 is a detailed circuit diagram of the null flow meter of Figure 5; and

Figures 1, 2, 3, 4:
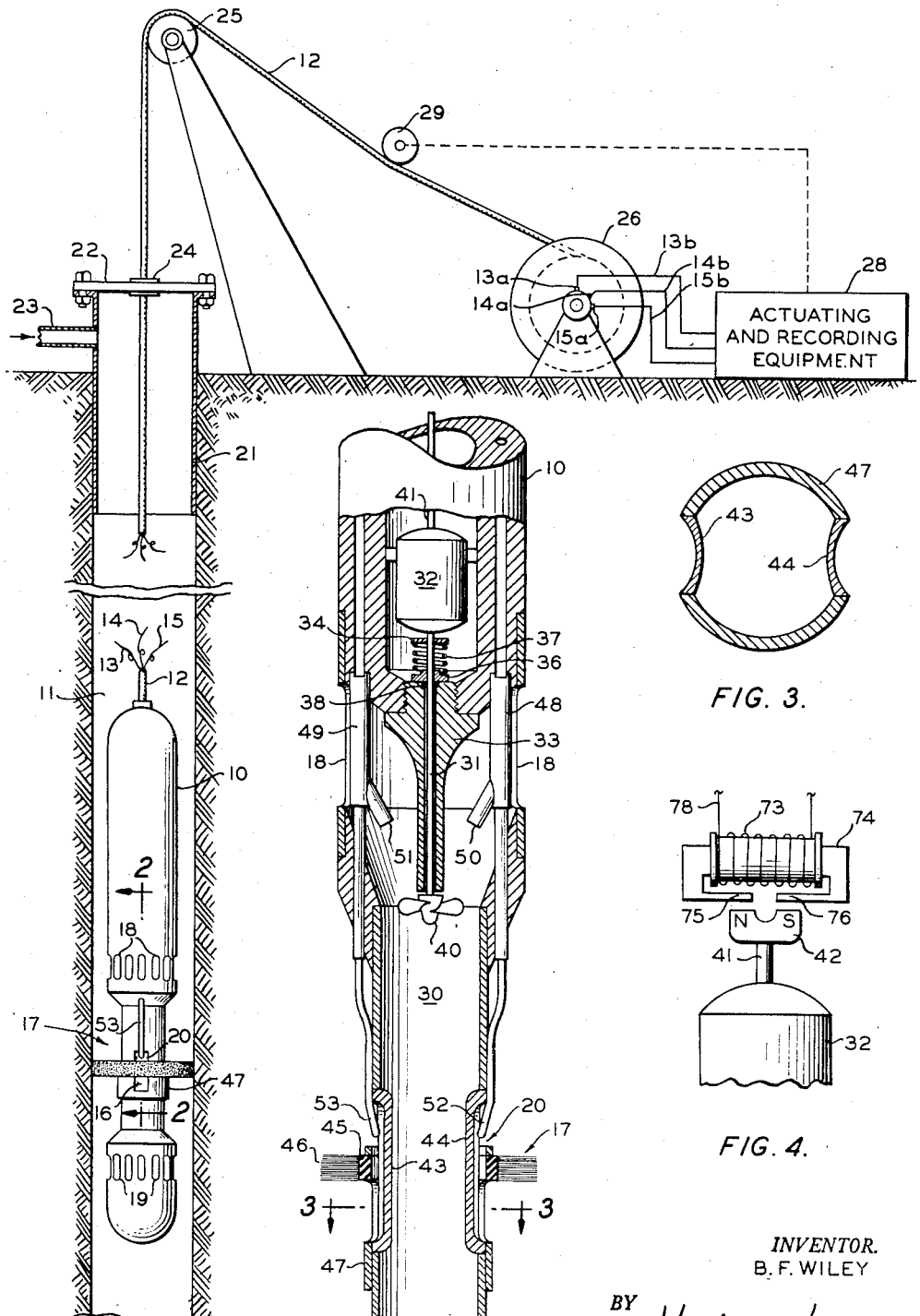
Figure 1 illustrates the water injectivity meter apparatus positioned within a bore hole.
Figure 2 is a vertical sectional view taken along line 2—2 in Figure 1.
Figure 3 is a horizontal sectional view taken along line 3—3 in Figure 2.
Figure 4 is a schematic view of the motor speed telemetering transmitter.

Referring now to the drawing in detail and to Figure 1 in particular, there is shown a fluid flow measuring assembly 10 which is positioned within a bore hole 11 by a cable 12. Cable 12 contains three electrical conductors 13, 14 and 15. A flexible packing device 17 is secured to assembly 10 and extends outwardly therefrom to engage the wall of the bore hole in a fluid-tight fit. Assembly 10 is provided with a plurality of first inlet openings 18 above packer 17. Fluid enters the assembly from the bore hole through openings 18 and is transmitted downwardly through the assembly and out into the bore hole through a plurality of openings 19 positioned below packer 17. A second flow path is provided between the regions above and below packer 17 by openings 20 and 16 in assembly 10 adjacent packer 17.

The upper portion of bore hole 11 is provided with a casing 21 which has a cap 22 secured thereto. A conduit 23 communicates with casing 21 to supply water to the well. It is the flow of this water through the well that is measured by assembly 10. Cable 12 extends through a packer 24 in cap 22, over a wheel 25, and is attached at its upper end to a motivated winch 26. Rotation of winch 26 raises and lowers assembly 10 in bore hole 11. Conductors 13, 14 and 15 terminate in respective slip rings on the shaft of winch 26. The slip rings are engaged by brushes 13a, 14a and 15a which are connected to actuating and control equipment 28 by respective conductors 13b, 14b and 15b. A wheel 29 rests on cable 12 and is mechanically connected to equipment 28 to provide an indication of the depth to which assembly 10 is lowered.

The center portion of assembly 10 is illustrated in detail in Figure 2. This portion of the assembly defines a passage 30 which communicates between inlet openings 18 and outlet openings 19, the latter not being shown in Figure 2. A first drive shaft 31 of a motor 32 extends downwardly through a bushing 33. A rotating collar 34 is secured to shaft 31 beneath motor 32. A second collar 36 is positioned about shaft 31 beneath collar 34 and spaced therefrom. Collar 36 is free to move longitudinally on shaft 27, but rotates therewith. A compression spring 37 is disposed between collars 34 and 36 to force the latter into fluid-tight engagement with an O-ring seal 38 carried by bushing 33. An impeller 40 is mounted on the lower end of drive shaft 31. A second drive shaft 41 extends upwardly from motor 32 to support a magnet 42, as illustrated in Figure 4. The second flow path between the regions above and below packer 17 is defined by a pair of concave plates 43 and 44 which are attached to the housing of assembly 10 adjacent packer 17. Packer 17, which can be in the form of an annular rubber member 45 having a plurality of bristles 46 extending outwardly therefrom, is mounted at approximately the midpoint of plates 43 and 44 by a support plate 47. Bristles 46 are impregnated with a heavy grease to form a fluid-tight barrier.

A pair of support rods 48 and 49 extends longitudinally through assembly 10. These rods position respective first temperature sensitive resistance elements 50 and 51 adjacent inlet openings 18. Rods 48 and 49 also position respective second temperature sensitive resistance elements 52 and 53 adjacent fluid opening 20. The rods contain electrical leads which extend from these resistance elements to the down-hole electrical indicating circuit of Figure 5 which is mounted within the upper portion of assembly 10.

The electrical circuit elements associated with the flow measuring apparatus are illustrated schematically in Figure 5. Temperature sensitive resistance elements 50, 51, 52 and 53 are connected in the respective arms of a bridge circuit 60. Elements 50 and 51 are connected in opposite arms of the bridge circuit, as are elements 52 and 53. The output signal from the bridge circuit thus provides a measurement representative of temperature differences between fluid inlets 18 and 20. Resistance elements 50, 51, 52 and 53 are selected to have high temperature coefficients of resistivity. Suitable thermistors having negative coefficients of thermal resistivity are available commercially and provide high sensitivity. The junction of bridge circuit 60 between elements 50 and 53 is connected to one terminal of a direct current voltage source 61. The second terminal of voltage source 61 is connected to the contactor of a potentiometer 62. The first end terminal of potentiometer 62 is connected to one end terminal of element 51, and the second end terminal of potentiometer 62 is connected to one end terminal of element 52. The junction between elements 50 and 52 is connected to a first conductor 13 which extends to the surface through cable 12. The junction between elements 51 and 53 is connected to conductor 14 which also extends to the surface through cable 12. A null flow indicating meter 63 is connected between conductors 13 and 14 at the surface.

Bridge circuit 60 is balanced initially when the flow measuring assembly is positioned at, or near, the surface of the bore hole and with a small flow therethrough to eliminate effect of varying convection currents. This initial balance is accomplished by adjustment of the contactor of potentiometer 62 until a null reading is obtained on meter 63. In order to eliminate the necessity of opening assembly 10 to make this adjustment, a small reversible direct current motor 65 is mounted within the assembly. The drive shaft of motor 65 is mechanically connected to the contactor of potentiometer 62. One terminal of motor 65 is connected to ground and the second terminal thereof is connected to a terminal 66 which is mounted on the outside surface of assembly 10 so that one end terminal of a double-pole double-throw reversing switch 67 can be connected thereto. The corresponding second end terminal of switch 67 is connected to ground. The center terminals of switch 67 are connected to the respective end terminals of a voltage source 68. Motor 65 can thus be driven in either direction to move the contactor of potentiometer 62 until a null signal is observed on meter 63. The bridge circuit is then in a condition of initial balance.

Motor 32 is energized from a source of direct current 70 which is positioned at the surface. One terminal of current source 70 is connected to ground, as is one terminal of motor 32. The second terminal of current source 70 is connected to the second terminal of motor 32 through a variable resistor 71 and conductor 15, the latter being contained within cable 12. The ground terminals of motors 32 and 65 can be connected to the metal housing of cable 12. The speed of rotation of motor 32 is adjusted by resistor 71 which varies the current supplied to the motor. Motor 32 rotates impeller 40 to pump fluid from inlet 18 through passage 30 to outlet 19.

Motor 32 also rotates magnet 42 to generate an electrical signal representative of the speed of rotation. With reference to Figure 4, a coil 73 is mounted in assembly 10 above magnet 42. An armature 74 extends through coil 73 and terminates in spaced pole pieces 75 and 76 adjacent the poles of magnet 42. Rotation of magnet 42 thus induces a voltage across the end terminals of coil 73 at a frequency proportional to the speed of rotation of magnet 42. The first end terminal of coil 73 is connected to ground and the second end terminal thereof is connected to a lead 78. Lead 78 is connected to ground through a temperature sensitive resistance element 79 which has a negative coefficient of thermal resistivity. Lead 78 is also connected through capacitors 80 and 81 to respective conductors 13 and 14. Capacitors 83 and 84 are connected in series relation between conductors 13 and 14 at the surface. A lead 85 is connected between the junction between capacitors 83 and 84 and the first input terminal of a frequency meter 86. The second input terminal of meter 86 is connected to ground. The alternating voltage induced in coil 73 by rotation of magnet 42 is thus transmitted to the surface over conductors 13 and 14 and is applied to meter 86. A capacitor 88 is connected between conductor 15 and ground to prevent current flow through coil 73 from source 70.

In operating the flow measuring apparatus the bridge circuit initially is balanced, as previously described. The assembly is then lowered into the well to a selected depth by rotation of winch 26. Water is pumped into the well at the surface through conduit 23. The flow through the well past packer 17 can follow one of two paths: from openings 18 through passage 30 to openings 19, or from openings 20 to openings 16. Impeller 40 is rotated by motor 32 at a speed such that water is pumped through passage 30 at a rate to eliminate flow between openings 20 and 16. The increased flow created by impeller 40 effectively eliminates the pressure differential across packer 17. Thus, there is no tendency for fluid to leak past packer 17, and the total fluid flow is through passage 30.

The condition of null flow between openings 20 and 16 is determined by bridge circuit 60. The bridge is unbalanced a maximum amount when the total flow through the well is past elements 50 and 51 so that there is zero flow past elements 52 and 53. This results from the cooling effect of the flowing fluid on elements 50 and 51. This unbalance is indicated by meter 63. The speed of motor 32 is adjusted by variable resistor 71 to obtain this condition. The speed of rotation of motor 32 is measured by the frequency of the alternating signal induced in coil 73. This signal is transmitted over conductors 13 and 14 to meter 86. A choke coil, not shown, can be inserted in series with meter 63 if necessary to prevent alternating current flow through the meter. Temperature sensitive resistor 79 has a negative coefficient of thermal resistivity. It has been found that undesirable interference often results between the individual circuits if the amplitude of the output signal from coil 73 rises excessively, as may result at high speeds of rotation. This is prevented, however, by resistor 79 which offers less resistance as the output voltage from coil 73 increases. The decreased resistance shunts a greater portion of the signal to ground so that the signal transmitted to frequency meter 86 remains of substantially constant amplitude.

Thus, at each depth at which a flow measurement is to be made, the speed of motor 32 is adjusted until meter 63 indicates maximum bridge unbalance. In accordance with this invention the measurements are recorded automatically. With reference to Figure 5, a printing recorder 100 is provided. The chart 101 of recorder 100 is driven by wheel 29 so that the chart is positioned relative to printing head 102 as a function of the depth to which assembly 10 is lowered. Printing head 102 is positioned in accordance with the output signal of meter 86 which represents the impeller speed of rotation. Recorder 100 is of the type which prints only when a printing element therein is energized. This is represented schematically by a coil 103. Whenever current is supplied to coil 103 the output signal of meter 86 is recorded on chart 101, as by a mark 104.

Coil 103 is connected in circuit with a current source 106, a rotary switch 107 and a solenoid actuated switch 108. Rotary switch 107 comprises a rotating arm 109 which engages a contact 110 once during each revolution. Arm 109 is mechanically coupled to wheel 29 so as to engage contact 110 whenever assembly 10 is lowered a preselected amount, five feet, for example. Winch 26 is stopped with arm 109 in engagement with contact 110. The speed of motor 32 is then varied until the bridge circuit is unbalanced a maximum amount. The output signal of meter 63 is representative of the bridge unbalance. This signal is applied to a solenoid 112 which closes switch 108 when said signal reaches a predetermined maximum. Closure of switch 108 energizes coil 103 to actuate recorder 100. A second solenoid 113 is provided to reset the recorder by opening switch 108. Solenoid 113 is connected in circuit with a current source 114 and a rotary switch 115. Switch 115 is coupled to wheel 29 so that an arm 116 engages a contact 117 at the same frequency arm 109 engages contact 110. However, arm 116 engages contact 117 shortly after arm 109 engages contact 110 and thereby opens switch 108 to deenergize the printing mechanism of recorder 100. Switch 108 remains open until solenoid 112 is again energized. A switch 119 is connected in parallel with switch 108 to permit manual operation of the printing mechanism of the recorder.

Meter 63 is illustrated in detail in Figure 6. Conductor 14 is connected to the center tap of the primary winding 125 of a transformer 126. The end terminals of winding 125 are connected to respective stationary contacts 127 and 128 of a converter 129. Conductor 15 is connected to the movable contact 130 of a converter 129. Contact 130 vibrates between contacts 127 and 128 at the frequency of a current source 132, 60 cycles, for example, which energizes a driving coil 133. This converts the D.C. bridge unbalance signal into an A.C. signal which can readily be amplified. A potentiometer 135 is connected in parallel with the secondary winding 136 of transformer 126. The contactor of potentiometer 135 is connected to the control grid of a triode 137. The anode of triode 137 is connected to the source of positive potential at a terminal 138 through a resistor 139, and the cathode of triode 137 is grounded through a resistor 140 and a potentiometer 141 which are connected in series relationship. A capacitor 143 is shunted across series connected resistor 140 and potentiometer 141. The anode of triode 137 is connected to the control grid of a second triode 144 through a capacitor 145. The control grid of triode 144 is grounded through a resistor 146; the anode of triode 144 is connected to potential terminal 138 through a resistor 148; and the cathode of triode 144 is grounded through a bias resistor 149 which is shunted by a capacitor 150. The anode of triode 144 is connected to one end terminal of the primary winding 151 of a transformer 152 through a capacitor 153. The second end terminal of winding 151 is grounded. The junction between winding 151 and capacitor 153 is connected to the contactor of potentiometer 141 through a capacitor 155. This last-mentioned connection provides a degenerative feedback path between the anode of triode 144 and the cathode of triode 137. The center tap of the secondary winding 156 of transformer 152 is maintained at ground potential, and the two end terminals of winding 156 are connected to first end terminals of respective rectifiers 158 and 159. The second end terminals of rectifiers 158 and 159 are joined together and connected to ground through a capacitor 160 and to a first terminal of an inductor filter 161. The second terminal of inductor 161 is connected to ground through a capacitor 162 and to one end terminal of a potentiometer 164. A current indicating meter 165 is connected between the contactor of potentiometer 164 and ground to measure the rectified output signal from the two-stage resistance-capacitance coupled amplifier thus far described. Solenoid 112 is connected in parallel with meter 165. Solenoid 112 thus closes switch 108 of Figure 5 when the current supplied thereto reaches a predetermined value. This value represents maximum unbalance of bridge circuit 60.

Figure 7:
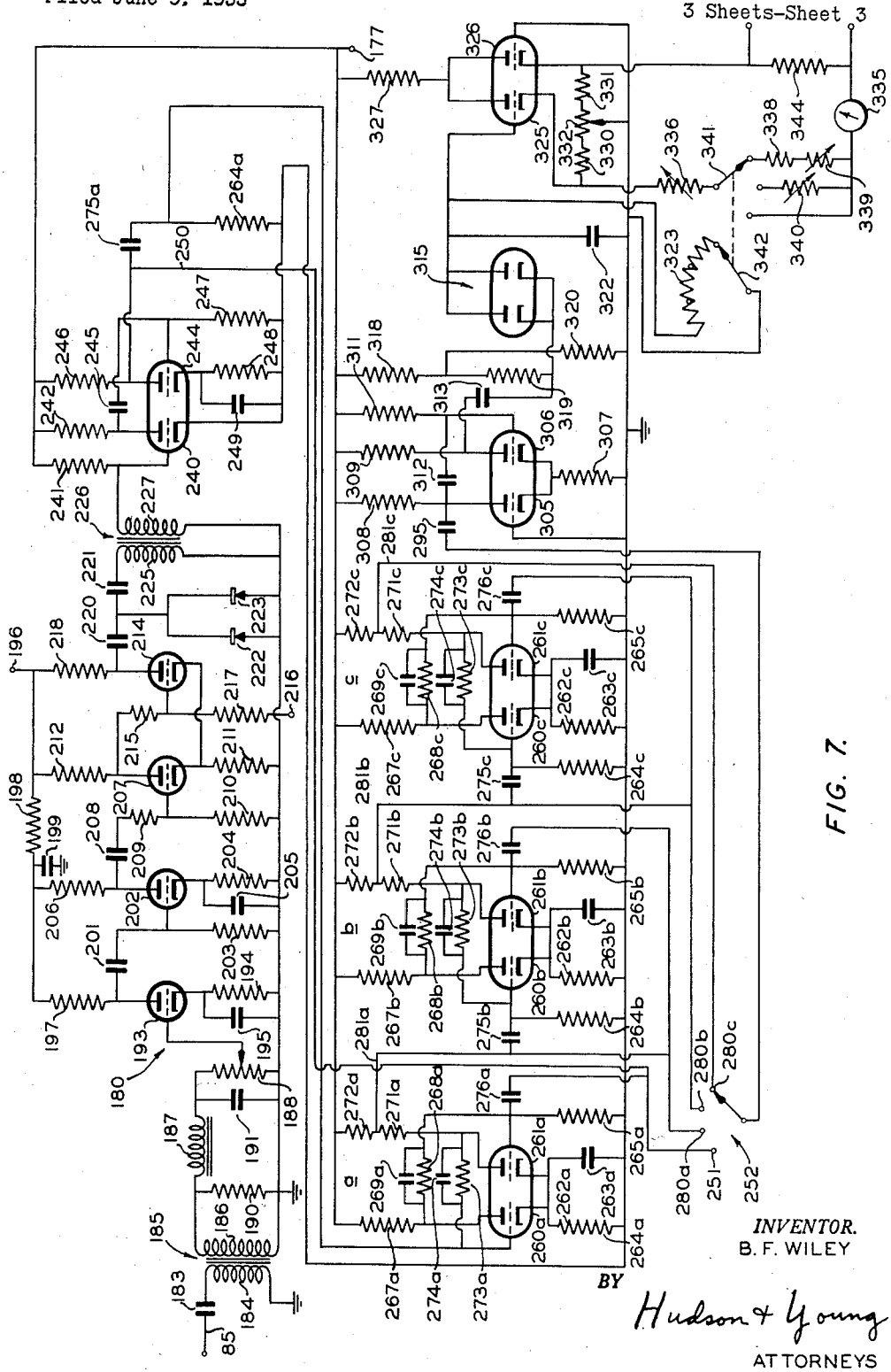
Figure 7 is a detailed circuit diagram of the frequency meter of Figure 5.

Frequency meter 86 is illustrated in detail in Figure 7. The voltage induced in coil 73 varies in susbtantially a sinusoidal fashion. This voltage is applied to the input terminals of a pulse shaping circuit 180 which provides sharp output pulses of a frequency proportional to the frequency of the input signal applied thereto. Lead 85 of Figure 5 is connected through a capacitor 183 to the first end terminal of the primary winding 184 of a transformer 185. The second end terminal of transformer winding 184 is connected to ground. The first end terminal of the secondary winding 186 of transformer 185 is connected through an inductor 187 to one end terminal of a potentiometer 188. The second end terminal of transformer winding 186 is connected to ground, as is the second end terminal of potentiometer 188. A resistor 190 is connected in parallel with transformer winding 186, and a capacitor 191 is connected in parallel with potentiometer 188. The contactor of potentiometer 188 is connected to the control grid of a first triode 193. The cathode of triode 193 is connected to ground through a resistor 194 which is shunted by a capacitor 195. The anode of triode 193 is connected to a positive potential terminal 196 through series connected resistors 197 and 198. A capacitor 199 is connected between ground and the junction between resistors 197 and 198.

The anode of triode 193 is connected through a capacitor 201 to the control grid of a second triode 202. The control grid of triode 202 is connected to ground through a resistor 203. The cathode of triode 202 is connected to ground through a resistor 204 which is shunted by a capacitor 205. The anode of triode 202 is connected to potential terminal 196 through series connected resistors 206 and 198. The anode of triode 202 is also connected to the control grid of a third triode 207 through a capacitor 208 and a resistor 209 which are connected in series relation. The control grid of triode 207 is connected to ground through a resistor 210. The cathode of triode 207 is connected to ground through a resistor 211. The anode of triode 207 is connected to terminal 196 through a resistor 212. The anode of triode 207 is also connected to the control grid of a triode 214 through a resistor 215. The control grid of triode 214 is connected to a negative potential terminal 216 through a resistor 217. The cathode of triode 214 is connected to the cathode of triode 207. The anode of triode 214 is connected to terminal 196 through a resistor 218. The anode of triode 214 is also connected to one terminal of the primary winding 225 of a transformer 226 through series connected capacitors 220 and 221. The second terminal of transformer winding 225 is connected to ground. A first rectifier 222 is connected between ground and the junction between capacitors 220 and 221, and a second rectifier 223 is connected in parallel with rectifier 222.

The circuit of Figure 7 thus far described serves to convert a substantially sinusoidal input signal into output pulses. Inductor 187 and capacitor 191 function as a filter to block any high frequency extraneous noise signals which may be present. The input signal is amplified by triodes 193 and 202. Triode 207 is biased so as to conduct only when an input signal of preselected magnitude is applied to the control grid thereof. Thus, triode 207 conducts during only a portion of each cycle of the input signal. Triode 214 normally is conductive in the absence of an input signal. Conduction by triode 207 results in the control grid of triode 214 being driven more negative to diminish or extinguish current flow through triode 214. The voltage at the anode of triode 214 thus increases. Capacitor 220 charges through diodes 222 and 223 when the potential at the anode of triode 214 increases and discharges through capacitor 221 and transformer winding 225 when the potential at the anode of triode 214 decreases. The frequency of the pulses transmitted by transformer 226 is thus representative of the frequency of the output signal from coil 73.

The first end terminal of transformer winding 227 is connected to the control grid of a triode 240. The control grid of triode 240 is connected to a positive potential terminal 177 through a resistor 241. The anode of triode 240 is connected to terminal 177 through a resistor 242, and the cathode of triode 240 is connected to ground. The anode of triode 240 also is connected to the control grid of a triode 244 through a capacitor 245. The anode of triode 244 is connected to positive potential terminal 177 through a resistor 246; the control grid of triode 244 is grounded through a resistor 247; and the cathode of triode 244 is grounded through a bias resistor 248 which is shunted by a capacitor 249. The anode of triode 244 is connected by a lead 250 to a first terminal 251 of a selector switch 252. Triode 240 normally is conductive because of the positive potential applied to its control grid through resistor 241. However, each time a negative pulse is applied to the control grid of triode 240 from circuit 180 the conduction is reduced to increase the potential on the anode. This increased potential is applied to the control grid of triode 244, which results in a reduction in potential on the anode thereof. The net result is an amplified negative pulse being applied to terminal 251.

A frequency divider counting circuit is connected to the output circuit of triode 244 to facilitate counting the pulses generated by circuit 180. This frequency division is accomplished by three identical Eccles-Jordan trigger circuits designated by the reference letters a, b, and c. In order to simplify the description of this pulse divider circuit, only the a trigger circuit will be described in detail, it being understood that the b and c circuits are constructed and operate in like manner.

The a counting circuit comprises a pair of identical triodes 260a and 261a having their cathodes grounded through a common bias resistor 262a that is shunted by a capacitor 263a. The control grids of triodes 260a and 261a are grounded through respective resistors 264a and 265a. The anode of triode 260a is connected to positive potential terminal 177 through a resistor 267a and to the control grid of triode 261a through a resistor 268a which is shunted by a capacitor 269a. The anode of triode 261a is connected to positive potential terminal 177 through series connected resistors 271a and 272a and to the control grid of triode 260a through a resistor 273a which is shunted by a capacitor 274a. The anode of triode 244 is connected to the control grid of triode 260a through a capacitor 275a and to the control grid of triode 261a through a capacitor 276a.

As is well known to those skilled in the art, the trigger circuit thus far described is arranged whereby the anode of one triode controls the control grid of the second and vice versa. This results in only one tube conducting at any given time. For purposes of discussion, it will arbitrarily be assumed that triode 260a is conducting initially. The negative output pulse from the anode of triode 244 is applied simultaneously to the control grids of triodes 260a and 261a. Because triode 261a already is non-conducting, this negative pulse applied to the grid thereof does not affect the operation of the tube. The negative pulse applied to the control grid of triode 260a, however, tends to decrease the conduction of triode 260a, thereby increasing the potential on the anode thereof. This increased anode potential is applied to the control grid of triode 261a to cause the latter triode to become conducting. This in turn decreases the potential on the anode of triode 261a, which decreased potential is applied back to the control grid of triode 260a to further decrease the conduction therethrough. Such potential transfer is continuous until triode 261a is conducting and triode 260a is cut off. The two triodes then remain in this latter condition until a second pulse from triode 244 is applied to the two control grids thereof. The second pulse reverses the previous operation of the two tubes to restore triode 260a to its initial condition of conduction and triode 261a to cut off. Thus it can be seen that two negative pulses are required to complete the cycle of operation of the a trigger circuit.

The output signal from the a circuit is applied to terminal 280 of switch 252 by a lead 281a which is connected to the junction between resistors 271a and 272a. Accordingly, a single negative pulse is applied to terminal 280 for each two negative pulses applied to terminal 251. The output negative pulses applied to terminal 280 also are applied to the two control grids of the b trigger circuit through respective capacitors 275b and 276b. The output signal from the b circuit is applied to terminal 280b of switch 252 by a lead 281b and to the two control grids of the c trigger circuit through respective capacitors 275c and 276c. The output signal from the c counter circuit is applied to terminal 280c of switch 252. Thus by movement of the contactor of switch 252 through terminals 251, 280a, 280b and 280c, pulses are obtained which represent, respectively, the number of pulses generated by switch 150 per unit time, one-half of such pulses, one-fourth of such pulses and one-eighth of such pulses. This accommodates a wide range in speed of motor rotation.

In order to provide a quantitative measure of the speed of rotation of impeller 40 a circuit is provided which includes a one-shot multivibrator adapted to provide a uniform shaped pulse for each input negative pulse applied thereto, a rectifier, an integrating circuit, and an output meter. The signal indicated by the meter is also applied to recorder 100.

The multivibrator includes a pair of triodes 305 and 306 having their cathodes grounded through a common resistor 307. The anodes of triodes 306 and 307 are connected to positive potential terminal 177 through respective resistors 308 and 309. The control grid of triode 305 is connected directly to ground, and the control grid of triode 306 is connected to positive potential terminal 177 through a resistor 311. The contactor of switch 252 is connected to the anode of triode 305 through a capacitor 295. The anode of triode 305 is connected to the control grid of triode 306 through a capacitor 312. The anode of triode 306 is connected through a capacitor 313 to the two cathodes of a double rectifier tube 315. A pair of series connected resistors 317 and 318 is connected between positive potential terminal 177 and the cathodes of tube 315. A resistor 320 is connected between ground and the junction between resistors 318 and 319. The two anodes of tube 315 are connected together and to ground through a capacitor 322 which is shunted by a variable resistor 323. The anodes of tube 315 also are connected to the control grid of a triode 325. The anode of triode 325 is connected to the anode of a second triode 326 and to positive potential terminal 177 through a resistor 327. The control grid of triode 326 is connected directly to ground. The cathode of triode 325 is connected to the cathode of triode 326 through a voltage dividing network comprising a resistor 330, a potentiometer 332 and a resistor 331.

The contactor of potentiometer 322 is connected to ground. The voltage dividing network including resistors 330 and 331 and potentiometer 322 is shunted by a series connected second network including a resistor 334, a current measuring meter 335 and a variable resistor 336 which is selectively connected through a switch 341 in series with either a pair of resistors 338 and 339, a single resistor 340, or directly to meter 335. Switch 341 is mechanically connected to the contactor 342 of variable resistor 323 which varies the resistance connected between the anodes of tube 315 and ground. Thus, the larger the resistance of variable resistor 323 in shunt with capacitor 322, the larger the resistance in series with resistor 336 and meter 335.

The operation of this last-mentioned counting circuit can be explained in the following manner. The voltage dividing network including resistors 318, 319 and 320 is proportioned to maintain a sufficient positive potential on the cathodes of tube 315 to prevent any conduction therethrough under normal conditions. The negative pulses applied through switch 252, however, serve to reduce the potential on the cathodes of 315 by a sufficient amount that conduction takes place for a short time interval following each applied pulse. The one-shot multivibrator is employed to shape the input pulses to provide a pulse of constant magnitude irregardless of the magnitude of the pulse applied through switch 252. Triode 306 normally is conductive while triode 305 is maintained at cut-off. The negative pulse applied through capacitors 295 and 312 lowers the potential on the control grid of triode 306 which decreases the current flow therethrough. This in turn lowers the potential on the cathodes of triodes 305 and 306 which allows triode 305 to become conductive, thereby lowering the potential on the anode thereof and further lowering the potential on the control grid of triode 306. This results in triode 306 becoming non-conductive. This condition is unstable, however, because the control grid of triode 306 is connected to positive potential terminal 177 through a high resistor 311 while the control grid of triode 305 is directly connected to ground. Immediately following the negative pulse being applied to the control grid of triode 306, condenser is recharged through resistor 311 which causes triode 306 to become conductive once again and returns triode 305 to its original non-conductive condition. As triode 306 becomes conductive the potential on its anode is lowered. This results in a negative pulse being applied to the cathodes of 315 through capacitor 313 which enables tube 315 to conduct until stability is restored to the multivibrator circuit. Once stability is restored, tube 315 becomes non-conductive because of the positive potential maintained on the cathodes thereof through resistors 318, 319 and 320. The negative pulse applied to the cathode of tube 315 is of constant duration and magnitude. The output pulse from tube 315 resulting from conduction therethrough charges condenser 322 which forms an integrating circuit with resistor 323.

Triodes 325 and 326 and the resistors associated therewith form a bridge circuit comprising a vacuum tube voltmeter, the output signal of which is read on meter 335. The negative pulses transmitted through rectifier 315 are in effect applied to the control grid of triode 325 to reduce the current flow therethrough. This in turn creates an unbalance of the voltmeter bridge circuit which is indicated on meter 335. The time constant of the integrating circuit is adjusted by contactor 342 of resistor 323. This contactor is coupled to switch 341 so that the resistance connected in series with meter 335 is increased in proportion to the increased time constant by movement of switch 342 along resistor 323. Thus, a steady reading is obtained on meter 335 which represents the pulses produced per unit time by rotation of impeller 40. The readings of meter 335 are calibrated in terms of the volume of fluid passing impeller 40 per unit time. The voltage across resistor is applied to recorder 100 to position the printing head thereof.

While the flow measuring indicating system of the present invention has been described in conjunction with particular metering apparatus for use in water injection operations it should be apparent that the invention is not limited to such an application. Flow upwardly through a well can be measured by reversing the direction of rotation of motor 32. The particular circuits should be considered by way of illustration and not as limiting the invention thereto. Thus, while the invention has been described in conjunction with a present preferred embodiment, the invention obviously is not limited thereto.

What is claimed is:

1. Apparatus to measure fluid flow through a passage comprising an assembly adapted to be positioned within the passage, packing means extending outwardly from said assembly to engage the walls of the passage to divide the passage into first and second regions, first conduit means carried by said assembly to communicate between said first and second regions, second conduit means carried by said assembly to communicate between said first and second regions, means connected to said first conduit means to provide a first signal representative of fluid flow therethrough, an impeller positioned in said second conduit means, means to rotate said impeller at variable speeds so as to direct the total flow between said regions through said second conduit means, means to provide a second signal representative of the speed of rotation of said impeller and thereby the rate of fluid flow through said second conduit means, signal indicating means, and means responsive to said first signal to apply said second signal to said signal indicating means when the magnitude of said first signal is representative of zero flow through said first conduit means, said second signal then being representative of the total flow between said regions.

2. Apparatus to measure fluid flow through a passage comprising an assembly adapted to be positioned within the passage, packing means extending outwardly from said assembly to engage the walls of the passage to divide the passage into first and second regions, first conduit means carried by said assembly to communicate between said first and second regions, second conduit means carried by said assembly to communicate between said first and second regions, means connected to said first conduit means to provide a first signal representative of fluid flow through said first conduit means, an impeller positioned in said second conduit means, means to rotate said impeller at variable speeds so as to direct the total flow between said regions through said second conduit means, means to provide a second signal representative of the speed of rotation of said impeller and thereby the rate of fluid flow through said second conduit means, signal recording means, and means responsive to said first signal to record said second signal on said recording means when the magnitude of said first signal is representative of zero flow through said first conduit means, said second signal then being representative of the total flow between said regions.

3. Apparatus to measure fluid flow through a passage comprising an assembly adapted to be positioned within the passage, packing means extending outwardly from said assembly to engage the walls of the passage to divide the passage into first and second regions, first conduit means carried by said assembly to communicate between said first and second regions, second conduit means carried by said assembly to communicate between said first and second regions, a temperature sensitive impedance element positioned in said first conduit means, an electrical bridge network including said impedance element to provide a first electrical signal of magnitude representative of fluid flow through said first conduit means, an impeller positioned in said second conduit means, a motor connected to said impeller to rotate said impeller at variable speeds so as to direct the total flow between said regions through said second conduit means, means actuated by rotation of said impeller to provide a second electrical signal of magnitude representative of the speed of rotation of said impeller and thereby the rate of fluid flow through said second conduit means, signal recording means, and means responsive to said first signal to record said second signal on said recording means when the magnitude of said first signal is representative of zero flow through said first conduit means, said second signal then being representative of the total flow between said regions.

4. The combination in accordance with claim 3 wherein said means to provide said second signal comprises a coil, a magnet connected to said impeller for rotation therewith adjacent said coil to generate an electrical signal across said coil of frequency representative of the speed of rotation of said impeller, and circuit means connected across said coil to establish an electrical signal of magnitude representative of the frequency of the signal generated across said coil.

5. Apparatus to measure fluid flow through a bore hole comprising an assembly, means to lower said assembly into a bore hole, packing means extending outwardly from said assembly to engage the walls of the bore hole to divide the bore hole into two regions, first conduit means carried by said assembly to communicate between said first and second regions, second conduit means carried by said assembly to communicate between said first and second regions, means connected to said first conduit means to provide a first signal representative of fluid flow therethrough, an impeller positioned in said second conduit means, means to rotate said impeller at variable speeds so as to direct the total flow between said regions through said second conduit means, means to provide a second signal representative of the speed of rotation of said impeller and thereby the rate of fluid flow through said second conduit means, a signal recording medium, means to mark said medium, means to position said recording medium responsive to said means to lower said assembly, and means responsive to said first signal to actuate said means to mark so as to record said second signal on said recording medium when the magnitude of said first signal is representative of zero flow through said first conduit means, said second signal then being representative of the total flow between said regions.

6. The combination in accordance with claim 5 further comprising means responsive to said means to lower said assembly to retain said means to mark inoperative except when said assembly is positioned in the well at predetermined depths.

7. Apparatus to measure fluid flow through a bore hole comprising an assembly, means to lower said assembly into a bore hole, packing means extending outwardly from said assembly to engage the walls of the bore hole to divide the bore hole into two regions, first conduit means carried by said assembly to communicate between said first and second regions, second conduit means carried by said assembly to communicate between said first and second regions, means associated with said first conduit means to provide a first electrical signal representative of fluid flow therethrough, an impeller positioned in said second conduit means, means to rotate said impeller at variable speeds so as to direct the total flow between said regions through said second conduit means, means to provide a second electrical signal representative of the speed of rotation of said impeller and thereby the rate of fluid flow through said second conduit means, a signal recording medium, means to mark said medium, means to position said recording medium responsive to said means to lower said assembly, means including first and second switches to apply said second signal to said means to mark when said first and second switches are closed, means responsive to said means to lower said assembly to close said first switch when said assembly is positioned in the well at predetermined depths, and means responsive to said first signal to close said second switch when the magnitude of said first signal is representative of zero flow through said first conduit means.

8. The combination in accordance with claim 7 further comprising means responsive to said means to lower said assembly to open said second switch when said assembly is moved between adjacent ones of said predetermined depths.

9. The combination in accordance with claim 7 wherein said means to provide said first signal comprises a temperature sensitive impedance element positioned in said first conduit means, and an electrical bridge network including said impedance element to provide a first electrical signal of magnitude representative of fluid flow through said first conduit means; and said means to provide said second signal comprises a coil, a magnet connected to said impeller for rotation therewith adjacent said coil to generate an electrical signal across said coil of frequency representative of the speed of rotation of said impeller, and circuit means connected across said coil to establish an electrical signal of magnitude representative of the frequency of the signal generated across said coil.

10. Apparatus to measure fluid flow through a passage comprising an assembly adapted to be positioned within the passage, packing means extending outwardly from said assembly to engage the walls of the passage to divide the passage into first and second regions, first conduit means carried by said assembly to communicate between said first and second regions, second conduit means carried by said assembly to communicate between said first and second regions, a first temperature sensitive resistance element positioned in said first conduit means, a second temperature sensitive resistance element positioned in said second conduit means, a Wheatstone bridge circuit having said first and second resistance elements disposed in adjacent arms thereof, a current source applied across first opposite terminals of said bridge circuit, an impeller positioned in said second conduit means, a motor connected to said impeller to rotate said impeller at variable speeds so as to direct the total flow between said regions through said second conduit means, means actuated by rotation of said impeller to provide a first electrical signal of magnitude representative of the speed of rotation and of said impeller and thereby the rate of fluid flow through said second conduit means, a recording head, a recording medium, means to move said recording medium relative to said recording head, means to apply said first signal to said recording head, and means responsive to the voltage across second opposite terminals of said bridge circuit to move said recording head into engagement with said recording medium when the voltage across said second terminals of said bridge circuit exceeds a predetermined value.

References Cited in the file of this patent

UNITED STATES PATENTS

| | | |
|---|---|---|
| 1,415,499 | Tuttle | May 9, 1922 |
| 2,365,014 | Silverman et al. | Dec. 12, 1944 |
| 2,654,064 | Broding | Sept. 29, 1953 |
| 2,729,102 | Worth | Jan. 3, 1956 |

FOREIGN PATENTS

| | | |
|---|---|---|
| 681,874 | Great Britain | Oct. 29, 1952 |